Patented Nov. 8, 1932

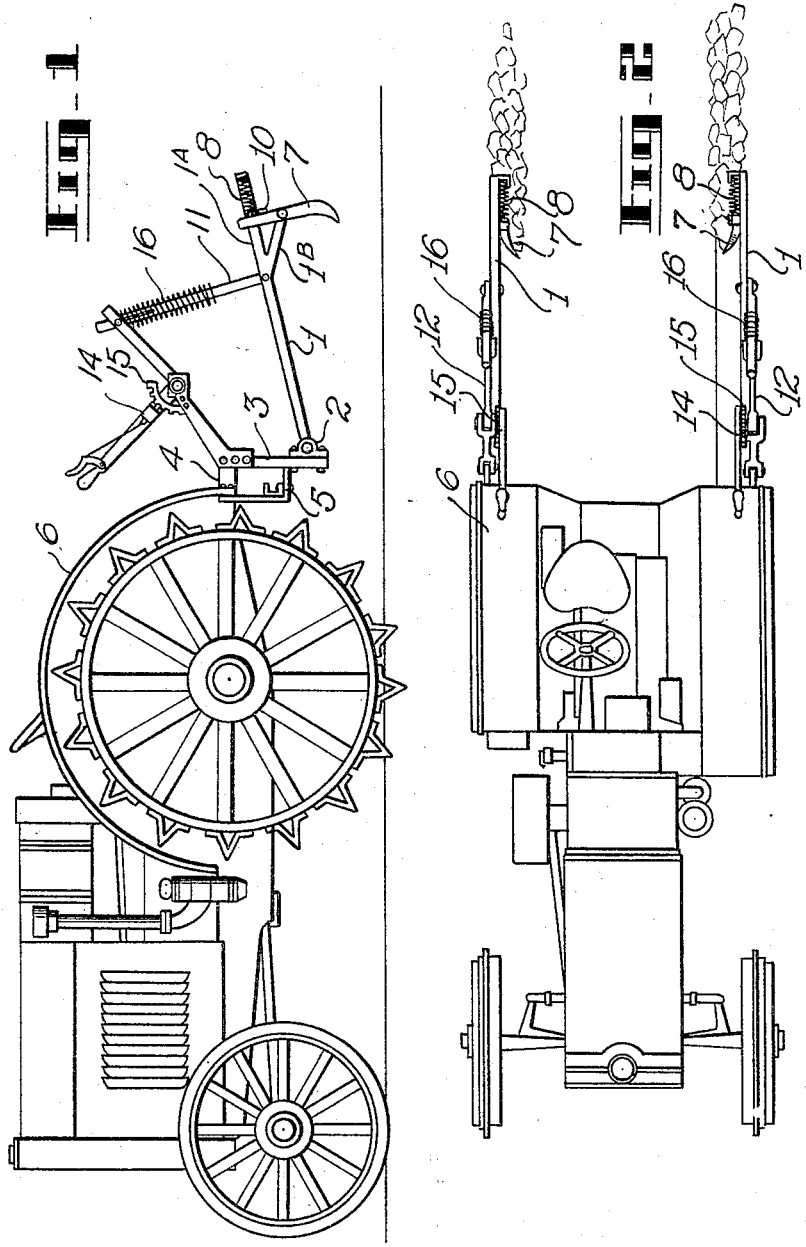

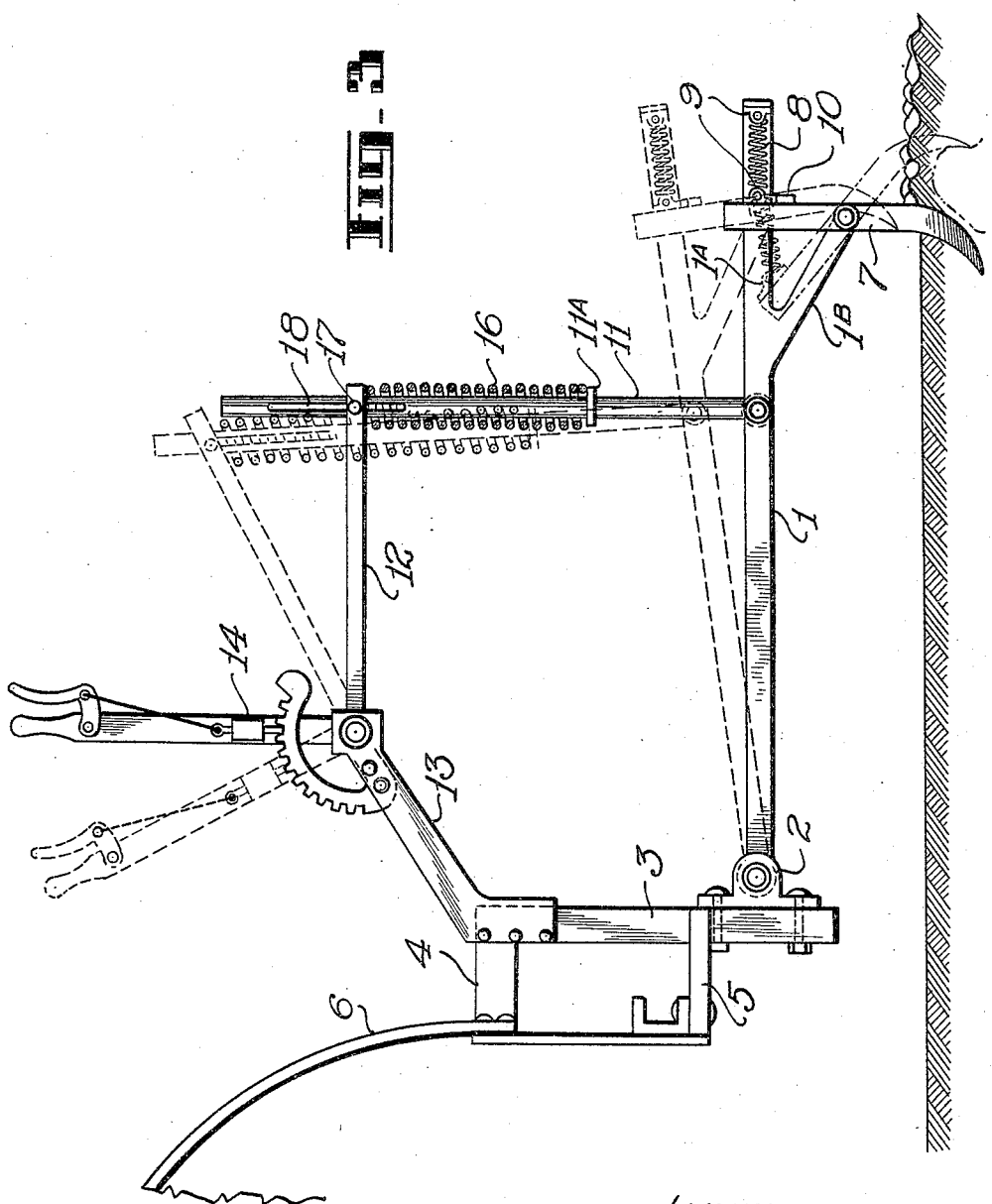

1,886,438

UNITED STATES PATENT OFFICE

GEORGE MELVILLE WEEKS, OF KRONAU, SASKATCHEWAN, CANADA

ANTIPACKING ATTACHMENT

Application filed February 28, 1931. Serial No. 519,057.

This present invention relates to new and useful improvements in an antipacking attachment designed especially for use with tractors and other heavy vehicles and has for its primary object an attachment of the character stated which will effectively counteract the detrimental results caused by heavy machinery passing over ploughed land.

Another object of the invention resides in the provision of an attachment of the character stated which will remove all evidence of the lug markings left by the tractor, which cause uneven ripening of crops.

A further object of the invention lies in the provision in an attachment of the character stated, of an automatic release of the soil engaging tooth which would function in the event of this part coming in contact with an immovable or firmly fixed object.

A still further object of the invention resides in the provision of an attachment of the character stated which has an adjustment, enabling the soil engaging tooth to burrow to a predetermined depth.

To the accomplishment of these and related objects as shall become apparent as the description proceeds, my invention resides in the construction, combination and arrangement of parts as shall be hereinafter more fully described, illustrated in the accompanying drawings and pointed out in the claim hereunto appended.

The invention will be best understood and can be more clearly described when reference is had to the drawings forming a part of this disclosure wherein like characters indicate like parts throughout the several views.

In the drawings:—

Figure 1 is a side elevation of my attachment applied to a tractor of conventional lines;

Figure 2 is a plan thereof; and

Figure 3 is an enlarged detailed elevation of the invention.

Referring more in detail to the drawings, it is to be noted that a normally horizontal arm 1 extending rearward, is hinged by an attaching member 2 to a bracket 3, which in turn is rigidly connected to the tractor frame 4. A brace 5 joining the wheel guard 6 and the aforementioned bracket 3 serves to strengthen the connection between the antipacking device and the towing tractor. Toward the rear, the horizontal arm 1 forks, one section 1A continuing straight, the other 1B deflecting downward and to the rear at an acute angle. A normally vertical soil engaging tooth 7 is hinged intermediate its top and bottom to the rear of the lower arm of the fork. The lower end of this vertical soil engaging tooth 7 curves inward to produce a ploughing effect on the surface of the soil packed hard by the advancing tractor wheel; while the upper end of this ploughing member 7 is connected to the rear of the straight section of the fork by means of a tension spring 8, stretched between suitable clips 9 carried respectively by said membr 7 and the rear end of said straight portion 1A. To prevent the spring from drawing the soil engaging tooth 7 beyond its desired vertical position a retaining snubber or stop 10 is formed on the spring side of said straight forked arm. This spring in addition to holding the soil engaging tooth in a normally vertical position allows it, should occasion arise, to tilt and pass over a large stone or other obstruction.

To raise the device from contact with the ground when not in use, an upright post 11, pivoted at its base to the horizontal arm 1 is connected near its upper end to the extension of a bell crank 12, fulcruming in an upwardly inclined and rearwardly extending bracket 13, carried by the tractor frame 4. The upper extension of said bell crank 12 constitutes a ratchet lever 14 operating on a segmental toothed rack 15 rigidly supported on the aforementioned bracket 13.

To overcome various soil conditions and in order to make the antipacker cut deeper if desired, a compression spring 16 encircles the upright post 11 that joins the horizontal arm 1 and the lifting device 12. The lower end of the spring is supported in position on the post by a flange 11A and the desired pressure exerted upon its upper end by the under side of the bell crank arm 12 that is terminally bifurcated to embrace said post 11 and carries a transverse pin 17 that extends through the elongated slot 18 in the post.

As the construction of the device has thus been described in detail, brief reference is now had to its use and method of operation; it will be manifest that these antipackers positioned behind each drive wheel will effectively eliminate any harmful effect due to the passage of a tractor across a ploughed field for regardless of the weight of the tractor or the depth of the wheel lugs the device can be so adjusted to loosen the packed soil and remove the tread marks. The removal of these markings not only facilitates seeding but permits more uniform ripening of crops on account of the evened texture of the soil.

From the foregoing description taken in connection with the accompanying drawings, it will be manifest that an antipacking attachment is provided that will fulfill all the necessary requirements of such a device but as many changes could be made in the above description and many apparently widely different embodiments of my invention may be constructed within the scope of the appended claim without departing from the spirit or scope thereof, it is intended that all matters contained in the said accompanying specification and drawings, shall be interpreted as illustrative and not in a limitative or restrictive sense.

Having thus described my invention, what I claim as new and desire to secure by Letters Patents is:—

An antipacking attachment for use with heavy vehicles comprising an attaching bracket, a normally horizontal trailing arm hinged at its forward end in said bracket and forked vertically at its free end, an abutting stop on the top member of said forked end, a soil engaging tooth pivoting on the lower member of the forked end, and a spring stretched between the top of said soil engaging tooth and the rear end of said top member of the forked end for normally holding said soil engaging tooth in contact with said stop.

In testimony whereof I hereunto affix my signature.

GEORGE M. WEEKS. [L. S.]